United States Patent
Krause et al.

(10) Patent No.: US 7,306,754 B2
(45) Date of Patent: Dec. 11, 2007

(54) MEMBRANE AND THE USE THEREOF

(75) Inventors: Bernd Krause, Hechingen (DE);
Christel Mohlenkamp, Haren (DE);
Hylke Sijbesma, Enschede (NL);
Heiner Strahtmann, Tubingen (DE);
Matthias Wessling, Enschede (NL)

(73) Assignee: Universitat Twente, Enschede (NL)

( * ) Notice: Subject to any disclaimer, the term of this patent is extended or adjusted under 35 U.S.C. 154(b) by 190 days.

(21) Appl. No.: 10/332,327

(22) PCT Filed: Jun. 15, 2001

(86) PCT No.: PCT/EP01/06730

§ 371 (c)(1),
(2), (4) Date: Aug. 18, 2003

(87) PCT Pub. No.: WO02/04554

PCT Pub. Date: Jan. 17, 2002

(65) Prior Publication Data

US 2004/0020853 A1    Feb. 5, 2004

(30) Foreign Application Priority Data

Jul. 8, 2000    (DE) ............................ 100 33 401

(51) Int. Cl.
*B29D 44/34*    (2006.01)
*B29D 44/36*    (2006.01)
*C08J 9/28*    (2006.01)
*B01D 39/00*    (2006.01)
*B01D 39/14*    (2006.01)

(52) U.S. Cl. ............................ 264/51; 264/41; 264/50; 521/64; 210/500.39; 210/500.41; 210/500.23

(58) Field of Classification Search ................ 264/41, 264/50, 51, 45.6, 45.9, 54, 500.23; 210/500.27, 210/500.23, 500.38, 500.41, 500.39; 521/64; 424/443

See application file for complete search history.

(56) References Cited

U.S. PATENT DOCUMENTS

| | | | |
|---|---|---|---|
| 4,380,594 A * | 4/1983 | Siggel et al. ............... | 521/182 |
| 4,473,665 A * | 9/1984 | Martini-Vvedensky et al. ........................... | 521/79 |
| 5,013,767 A * | 5/1991 | Malon et al. ................. | 521/64 |
| 5,116,883 A * | 5/1992 | LeMay ....................... | 521/178 |
| 5,209,848 A * | 5/1993 | Jeanes et al. ............... | 210/490 |
| 5,418,061 A * | 5/1995 | Parham et al. .............. | 428/398 |
| 5,422,377 A * | 6/1995 | Aubert ....................... | 521/64 |
| 5,547,575 A * | 8/1996 | Demmer et al. ............ | 210/490 |
| 5,710,187 A * | 1/1998 | Steckle et al. ............... | 521/64 |
| 5,723,510 A * | 3/1998 | Kabumoto et al. ......... | 521/182 |
| 5,830,923 A * | 11/1998 | Venkataraman .............. | 521/64 |
| 5,853,633 A * | 12/1998 | Kono et al. .................. | 264/54 |
| 5,980,795 A * | 11/1999 | Klotzer et al. ............... | 264/41 |
| 6,534,084 B1 * | 3/2003 | Vyakarnam et al. ........ | 424/443 |
| 6,620,356 B1 * | 9/2003 | Wong et al. .................. | 264/41 |
| 6,808,375 B2 * | 10/2004 | Klotzer ....................... | 425/4 C |
| 6,902,693 B2 * | 6/2005 | Klotzer ....................... | 264/45.9 |

* cited by examiner

*Primary Examiner*—Ana Fortuna
(74) *Attorney, Agent, or Firm*—Dinsmore & Shohl LLP (57) ABSTRACT

The invention relates to a membrane that consists of a polymer or a polymer mixture. The aim of the invention is to produce membranes, especially planar membranes or hollow fiber membranes that have an as high a separation efficiency as possible while simultaneously having a high membrane efficiency. To this end, the membrane has a gas- or liquid-permeable bicontinuous foam structure with orifices in the interior whose diameters do not exceed 500 nm.

14 Claims, 5 Drawing Sheets

MEMBRANE AND THE USE THEREOF

The invention relates to membranes that can be used for separating gases, for micro- or ultra-filtration and in particular for medical purposes, such as for haemodialysis, haemodiafiltration, plasmapheresis or immunotherapy.

German patent DE-A-19 520 188 discloses a process for producing polymeric hollow fibre membranes in which a molten polymer is used to produce the hollow fibre membrane using an extrusion apparatus, wherein the polymer is charged with pressurized gas before the melt enters the extrusion tool of the extrusion apparatus and wherein as a result of a predetermined pressure drop as the polymer exits the extrusion apparatus and the concomitant expansion of the gases in the polymer, a porous hollow fibre membrane is produced. The open porosity and pore size produced thereby does not produce satisfactory separation results, as the percentage of open porosity is too small and the pores are too large. The pore size determines the separation effect and the degree of open porosity determines the membrane efficiency.

International patent application WO-A-91/08 243 describes a process for producing open celled polyurethane foams by mixing a diisocyanate, a hydrogen donor, at least one surfactant, at least one catalyst and a blowing agent, preferably carbon dioxide, pressurizing the mixture in a mixing zone in order to keep the blowing agent liquid at ambient temperature, ejecting the mixture into an environment at atmospheric pressure to evaporate the blowing agent instantaneously, and curing the resulting foam at ambient temperature. This process suffers from the same disadvantages as those given for the process cited above.

The older but not previously published German patent application No. 199 07 824.6 pertains to a membrane that can be produced by forming a polymer or polymer mixture is brought into the desired form, which is charged with a gas at a pressure that is above atmospheric pressure prior to or after forming, and then by foaming the gas-charged polymer at a temperature that is above the glass transition temperature of the polymer/gas mixture, and then by stabilizing the foam structure by cooling, in which the gas-charged polymer is foamed with a quantity of a fluid that dissolves or swells the polymer. When producing such membranes, the solvent residues have to be removed by washing and the solvent must be recycled for practical reasons.

The aim of the invention is to produce membranes, in particular flat or hollow fibre membranes, with as high as possible a separation effect and simultaneously with high membrane efficiency.

SUMMARY OF THE INVENTION

In accordance with one embodiment of the present invention, a membrane is provided. The membrane comprises a polymer or polymer mixture, and the polymer or polymer mixture has a gas- or fluid-permeable bicontinuous foam structure with internal openings with a diameter of less than 500 nm. The diameter of the internal openings in the foam structure may be less than 250 nm or less than 200 nm.

In accordance with another embodiment of the present invention, a method of forming a membrane is provided. The method comprises forming a polymer or polymer mixture into a desired form, charging the polymer or polymer mixture with a gas at a pressure that is above atmospheric pressure prior to or after the forming, foaming the gas-charged polymer or polymer mixture at a temperature that is above the glass transition temperature of the polymer/gas mixture, and stabilizing the foam structure to form the membrane. The gas-charged polymer or polymer mixture may be foamed at a gas concentration in the polymer or polymer mixture that is above a critical concentration and at a temperature that is lower than a critical temperature. In accordance with yet another embodiment of the present invention, a method of using a membrane is provided. The method comprises providing a membrane comprising a polymer or polymer mixture, wherein said polymer or polymer mixture has a gas- or fluid-permeable bicontinuous foam structure with internal openings with a diameter of less than 500 nm, and using the membrane for medical purposes. The medical purposes may be selected from haemodialysis, haemofiltration, haemodiafiltration, plasmapheresis, immunotherapy, micro- or ultrafiltration, and gas separation.

BRIEF DESCRIPTION OF THE DRAWINGS

The following detailed description of the preferred embodiments of the present invention can be best understood when read in conjunction with the following drawings in which.

DETAILED DESCRIPTION OF THE PREFERRED EMBODIMENTS

The invention provides a membrane consisting of polymer or a polymer mixture and which is characterized in that it has a gas or fluid permeable bicontinuous foam structure with internal openings with a diameter of less than 500 nm, preferably less than 250 nm, in particular less than 200 nm.

These membrane properties can be obtained with membranes that are produced by forming a polymer or polymer mixture into the desired form, charging with a gas at a pressure that is above atmospheric pressure prior to or after forming, and in which the gas-charged polymer or polymer mixture is then foamed at a temperature that is above the glass transition temperature of the polymer/gas mixture and then the foam structure is stabilized, in which the gas-charged polymer or polymer mixture is foamed at a gas concentration in the polymer or polymer mixture that is above a critical concentration and at a temperature that is lower than a critical temperature. The foam structure is stabilized by cooling, preferably by quenching using an ethanol/water mixture.

The membranes of the invention have a percolating, micro- to nano-porous morphology and thereby exhibit a high membrane efficiency and good separation. On foaming, they do not need any polymer-dissolving or -swelling fluid, and so the disadvantages of an additional washing stage and solvent recycle stage are overcome.

Percolation of the membranes can be determined and evaluated as follows:

a) Using Scanning Electron Microscope Exposure:

The sample is broken in liquid nitrogen and the broken edges are analyzed. If the scanning electron microscope exposures exhibit openings or breaks in the foam morphology, this is indicative of percolation.

b) Using Flow Measurements:

A sample is fixed in a suitable measurement device, and the ends of the membranes are then broken in liquid nitrogen. The sample is then embedded in resin, so that the top and sides are completely covered. An open end is then fed with a gas or a liquid which can be pressurized. A gas or liquid is then admitted onto an open end, which can be carried out under pressure. Measuring the volume flow of the gas or liquid allows the percolation to be characterized. Percolation is indicated by a significantly higher flow compared with closed pore samples.

c) Using Capillary Rise:

A sample (length: 4 cm, width: 1 cm, thickness: ≦300 mm, thickness of foamed film) is fixed into an appropriate measuring apparatus, in which the ends of the polymer sample are broken in liquid nitrogen. The ends of the fixed sample is immersed for about 2 to 3 mm in a liquid or solution. After a suitable period, the rise of the fluid level in the membrane is measured. The weight change and rise allows the percolation to be characterized. Closed pore samples do not take up any liquid, and no rise can be measured.

Three types of processes can be considered for producing the membranes of the invention, which processes are known per se.

The first process is the pressure cell process, which is carried out batchwise and in which the polymer or polymer mixture is initially formed and is then charged with a gas under a pressure that is higher than atmospheric pressure and at a temperature that is below the glass transition temperature of the polymer/gas mixture. The temperature is then raised to a temperature that is above the glass transition temperature but below the critical temperature of the polymer/gas mixture, by immersing in a heating bath, and then the gas is driven out of the formed body to produce the desired bicontinuous foam structure. Transfer from the pressure cell to the heating bath must be carried out as fast as possible, so that the dissolved gas can quickly diffuse out of the polymer at ambient pressure. After foaming, the polymeric formed body must be quenched in an ethanol/water mixture at about 20° C.

The second process type is termed the autoclave process, in which the polymer or polymer mixture is charged with the gas at a temperature that is above the glass transition temperature of the polymer/gas mixture and foaming is induced by spontaneous release of the pressure. In contrast to the pressure cell process, in which the gas-charged polymer is normally transferred to a heating bath to raise the temperature to above the glass transition temperature but below the critical temperature of the polymer/gas mixture, the autoclave process does not need a heating stage as the polymer is already at the required temperature that is above the glass transition temperature on charging with the gas.

The third process type is termed the extrusion process, in which a melt of the polymer or polymer mixture is charged with the gas in an extrusion tool. Foaming occurs as the melt is ejected from the extrusion tool and the pressure thereby drops. In contrast to the two processes described above, this process is a continuous process.

The pressure cell process is preferred for use in producing the membranes of the invention.

The gas concentration in the polymer or polymer mixture and the temperature of foaming determine whether a bicontinuous foam structure with a micro- to nano-porous percolating morphology in accordance with the invention can be obtained.

The saturation period in the pressure cell depends on the polymer or polymers used and on the critical concentration to be obtained. The transfer period from the pressure cell to the heating bath must, as mentioned, be as short as possible and ensure that on foaming, i.e., in the heating bath, the concentration of gas in the polymer or polymer mixture remains above the critical concentration. Altering the foaming period in the heating bath can change the percolation. For reproducible production, it is therefore necessary to keep the transfer period and foaming period constant by using industrial instrumentation and to keep the saturation period in the pressure cell constant for a particular system of polymers and foaming gas.

The membranes of the invention can be a flat membrane, a hollow fibre membrane or a fibre membrane (monofilament membrane). Preferably, they are formed from an amorphous or semi-crystalline polymer or polymer mixture. Examples of polymers are polyimides, polyetherimides and polyethersulphones as well as polymer mixtures that contain at least 20% of at least one of said polymers. The polymers can be mixed so that normal pressure conditions can readily be employed to obtain a saturation concentration above the critical concentration. The critical concentration that on foaming, i.e., in the case of the pressure cell process which must be carried out in the heating bath, is suitably at least 40, preferably at least 43, in particular at least 45, more particularly at least 47 $cm^3$ (STP)/$cm^3$ of the polymer or polymer mixture. "STP" means standard temperature and pressure, namely 0° C. and 0.1013 MPa.

Although the invention is not limited to a special foam or charging gas, $CO_2$ is preferred.

Figure 1:
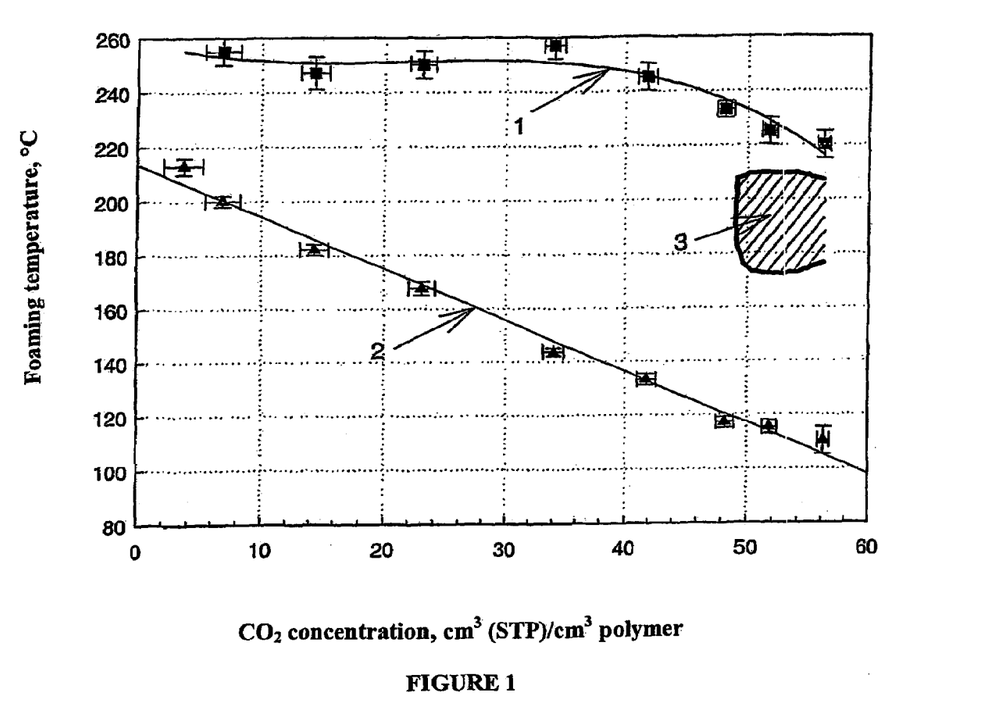
FIG. 1 is a foam diagram for the polyetherimide (Ultem 1000-1000) and carbon dioxide system of one embodiment of the invention.

Foaming is carried out at a temperature of at least 10° C. below the critical temperature. For each special combination of a polymer or polymer mixture and charging gas, a foam diagram has to be produced after determining the glass transition temperature of that polymer/gas mixture and the critical temperature of that polymer/gas mixture, which diagram includes, in the zone between the glass transition temperature and the critical temperature, a region above the critical gas concentration in which the morphology is bicontinuous. FIG. 1 shows the foam diagram for the polyetherimide (Ultem 1000-1000)/carbon dioxide system. The abscissa shows the concentration dissolved of carbon dioxide in cubic centimetres of $CO_2$ (STP)/$cm^3$ (polymer). The ordinate shows the foaming temperature in degrees Celsius. The line labeled 1 describes the critical temperature of the system, above which a foamed morphology can no longer be obtained. The line labeled 2 describes the glass transition temperature of the described system below which a foamed morphology cannot he obtained. This means that a foamed morphology can only be obtained in the zone lying between lines 1 and 2. With carbon dioxide concentrations of <6 $cm^3$ $CO_2$ (STP)/$cm^3$ (Ultem 1000-1000), determining the critical concentration is experimentally difficult. However, a concentration of 0 $cm^3$ $CO_2$ (STP)/$cm^3$ (Ultem 100-1000), can be expected to have a critical concentration that equals the glass transition temperature of the pure polymer. The glass transition temperature of the pure polymer is shown on this diagram as the point where line 2 cuts the ordinate at 0 $cm^3$ $CO_2$ (STP)/$cm^3$ (Ultem 1000-1000). The zone delineated as 3 shows the zone on the foam diagram in which bicontinuous membrane structures can be obtained. In this case, the foam diagram was only determined up to a carbon dioxide concentration of 57 cm$^3$ CO$_2$ (STP)/cm$^3$ (Ultem 1000-1000). The structures obtained between lines 1 and 2 but outside zone 3 exhibit a closed morphology.

For each polymer/charging gas system, a unique foaming diagram can be obtained and the position of the zone in which a bicontinuous membrane structure can be obtained can be determined. This zone can be altered if the foaming period, polymer properties and transfer time are changed. These parameters, therefore, are preferably kept constant in the process for producing the membrane of the invention.

The solubility of the charging gas (preferably CO$_2$) in polymers of polymer mixtures for determining which polymers and polymer mixtures can be used for producing the membranes of the invention can be determined as follows:

To determine the gas solubility of carbon dioxide in polymers and polymer blends, an apparatus is used that is similar to that developed by Koros and Paul (Koros, W J, Paul, D R, Design Conditions for Measurement of Gas Sorption in Polymers by Pressure Decay, J. Polym. Sci., 1976, 14, 1903-1907).

The sorption isotherms are determined at 25° C. up to a pressure of 5 MPa for carbon dioxide. The concentration of dissolved carbon dioxide is given in cubic centimetres of CO$_2$ at 0° C. and o.1013 MPa (standard temperature and pressure) (STP) per cubic centimetre of polymer; cubic centimetres of CO$_2$ (STP)/cm$^3$ (polymer).

It is also possible to use other volumetric or gravimetric methods that allow the solubility of a gas in a polymer to be determined.

The glass transition temperature (Tg) and the critical temperature of the polymer/gas mixture and the critical gas concentration are determined as follows:

Determination of the Glass Transition Temperature (T$_g$) of Polymer/Gas Mixtures Portions of the produced polymer film (polymer or polymer blend) are treated with the gas or gas mixture in a pressure cell. The saturation temperature is 25° C. Preferably, saturation is carried out with the gas or gas mixture at the temperature at which the sorption isotherm is also determined. This enables the determined gas pressures (equilibrium pressures) to be readily converted into concentration data. The gas pressure at which saturation with a gas (for example carbon dioxide) is carried out is termed the saturation pressure. Varying the saturation pressure and the saturation temperature can increase the corresponding saturation concentration.

The saturation period must be selected so that a homogeneous concentration profile is obtained. In the case of carbon dioxide as a physical blowing agent and for amorphous polymer films with a thickness of more than 100 μm, a saturation period of about 2 h is satisfactory.

After spontaneously releasing the saturation gas (for example carbon dioxide) from the pressure cell, the polymer sample is removed and immersed in a heating bath. Then the foaming stage is carried out. The immersion period is about 30 seconds. During immersion, the sample is moved constantly in the heating bath medium. Care should be taken that the polymer sample is completely immersed in the heating bath medium. The heating bath medium must be selected so that the polymer sample is neither physically nor chemically attacked during the foaming stage. After foaming, the plastic sample is quenched in an ethanol/water mixture (about 20° C.), preferably to a temperature below the glass transition temperature of the polymer.

A plurality of samples saturated at the same pressure with the blowing agent (for example carbon dioxide), are foamed at different temperatures. The temperatures at which the polymer sample remains transparent are determined along with those temperatures at which the polymer sample becomes opaque and milky. Further limitation of this temperature zone by foaming the polymer samples at temperatures that lie in the first zone allows the transition temperature (glass transition temperature) for this saturation pressure or the corresponding saturation concentration to be determined to within a few degrees. The optically determined glass transition temperature can be confirmed using the scanning electron microscope (SEM). Samples that are heated to a temperature that is lower than the glass transition temperature of the polymer/gas mixture exhibit a dense structure. Samples that are heated to a temperature that is above the glass transition temperature of the polymer/gas mixture exhibit cell formation. The glass transition temperature of a polymer/gas mixture is defined here as the mean between the temperature at which no foaming can be observed and the temperature at which cell formation can be observed using the TEM.

Varying the saturation pressure means that different blowing agent concentrations can be used in the polymer. In this way, the glass transition temperature for different blowing agent concentrations can be determined for a polymer/blowing agent mixture using the described foaming technique.

Determination of Critical Temperature of Polymer/Gas Mixtures

The critical temperature is defined as the foaming temperature above which no more foamed polymer morphology can be obtained, i.e., above which the density of the sample obtained after foaming is close to the density of the polymer sample used (>95% of the starting value). The critical temperature is above the glass transition temperature of the polymer/gas mixture.

Polymers of the polymer film produced (polymer or polymer blend) are treated with the gas or gas mixture in a pressure cell. The saturation temperature is 25° C.

The saturation period must be selected so that a homogeneous concentration profile can be obtained. In the case of carbon dioxide as a physical blowing agent and for amorphous polymer films with a thickness of more than 100 μm, a saturation period of about 2 h is satisfactory.

After spontaneously releasing the saturation gas (for example carbon dioxide) from the pressure cell, the polymer sample is removed and immersed in a heating bath. Then the foaming stage is carried out. The immersion period is about 30 seconds. During immersion, the sample is moved constantly in the heating bath medium. Care should be taken that the polymer sample is completely immersed in the heating bath medium. The heating bath medium must be selected so that the polymer sample is neither physically nor chemically attacked during the foaming stage. After foaming, the plastic sample is quenched in an ethanol/water mixture (about 20° C.), preferably to a temperature below the glass transition temperature of the polymer.

A plurality of samples saturated at the same pressure with the blowing agent (for example carbon dioxide), are foamed at increasing temperatures. It is observed that above a set critical temperature, a foamed polymer morphology can no longer be obtained. This is demonstrated by the fact that the polymer film is still (milky) transparent after foaming and the density of the foamed material is close to the density of the starting material (density of "pure" polymer). This can be confirmed using scanning electron microscopy (SEM). Samples heated to a temperature above the critical temperature display a dense non-cellular structure, while samples that have been heated to a temperature below the critical temperature exhibit a cellular structure.

Varying the saturation pressure allows different blowing agent concentrations to be employed in the polymer. In this manner, the critical temperature can be determined for different foaming medium concentrations using the foaming techniques described for a polymer/foaming medium mixture.

The critical temperature is dependent, inter alia, on the foaming period and on the concentration of the dissolved gas (for example the carbon dioxide concentration). For shorter foaming periods, the critical temperature is higher. Raising the concentration of the dissolved gas can drop the critical temperature. This means that for each foaming period and concentration of the dissolved gas, the critical temperature must be determined anew. This is particularly the case when a foaming process that is different from that described is used, as in this case the foaming period can vary widely from the values described.

Determination of Critical Gas Concentration

The critical gas concentration is defined as the lowest gas concentration (preferably the saturation gas concentration) above which at a foaming temperature limited by the glass transition temperature of the polymer/gas mixture as the lower limit and the critical temperature as the upper limit for the corresponding gas concentration (saturation concentration), percolation behaviour can be observed using the methods described at b) or c) below for one or more foamed polymer samples.

a) In the Pressure Cell Method

Parts of the polymer films produced (polymers or polymer blends) are treated with the gas or gas mixture in a pressure cell. The saturation temperature is 25° C.

The saturation period must be selected so that a homogeneous concentration profile is produced. In the case of carbon dioxide as the physical foaming medium and amorphous polymer films with a thickness of about 100 µm, a saturation period of about 2 h is satisfactory.

After spontaneously releasing the saturation gas (for example carbon dioxide) from the pressure cell, the polymer sample is removed and immersed in a heating bath. Then the foaming stage is carried out. The immersion period is about 30 seconds. During immersion, the sample is moved constantly in the heating bath medium. Care should be taken that the polymer sample is completely immersed in the heating bath medium. The heating bath medium must be selected so that the polymer sample is neither physically nor chemically attacked during the foaming stage. After foaming, the plastic sample is quenched in an ethanol/water mixture (about 20° C.), preferably to a temperature below the glass transition temperature of the polymer.

A plurality of samples, saturated with the blowing agent at the same pressure (for example carbon dioxide), are foamed at increasing temperatures. All samples that are foamed above the glass transition temperature of this polymer/gas mixture and below the critical temperature of this polymer/gas mixture are examined for their percolation behaviour.

b) In the Autoclave Method

In the autoclave method described above, saturation with the gas or gas mixture above is carried out the glass transition temperature of the polymer/gas mixture, and the foaming stage is initiated by spontaneously releasing the gas pressure. Thus, the foaming temperature is identical with the saturation temperature. If polymer samples are saturated or foamed with the gas or gas mixture at increasing temperatures, it appears that above a critical temperature, no more foamed polymer morphologies can be obtained. By varying the saturation conditions (gas pressure, temperature), different saturation concentrations in the polymers or polymer blends can be obtained. The critical temperature can be determined anew for these different saturation conditions (saturation concentrations).

c) In the Extrusion Method

In the extrusion method described above, foam formation occurs as the polymer/gas mixture exits the extruder head. Varying the temperature of the extruder head or the temperature of the extruding polymer/gas mixture enables the temperature above which no foamed polymer morphology can be obtained to be determined. As with the autoclave method described above, a variation in the saturation conditions (gas pressure, temperature) can produce different saturation concentrations in the polymer or polymer blend. For these different saturation conditions (saturation concentrations), the critical temperature can be determined anew.

To determine the foam diagram of a special polymer/gas mixture, the following is carried out: firstly, the sorption isotherm or isobar is determined in order to establish whether the critical concentration can be achieved. Then the pressure and temperature are adjusted to produce a concentration of 50 cm$^3$/cm$^3$ of polymer. Then, foaming is carried out at increasing temperatures, and then the foam characteristics are determined, for example by gas flow measurements, to determine the critical temperature for a particular foaming period.

Flat membranes can be prepared as follows using the pressure cell method:

Solutions of the plastic samples ("pure" polymer or polymer blends) are produced in suitable solvents (tetrahydrofuran, 1-methyl-2-pyrrolidone, dichloroethane, etc.).

Thin films of these polymer solutions are spread onto glass plates using a spreading knife. The coated glass plates are then dried at about 20° C. to 25° C. in a nitrogen stream in order to evaporate off the majority of the solvent.

Once the films are "hand dry" and can be removed from the glass plates,—a substantial amount of solvent still remains in the films. Depending on the solvent, plastic and drying conditions, these can be between 0.5% and 15% by weight. The films produced are about 100 µm thick.

The films are then dried further in a vacuum drier until the solvent concentration has dropped to below 0.02% by weight.

Extruded films or film parts of the corresponding polymer or polymer blends (free of solvent) can also be used.

The films of the different polymers or polymer mixtures are then saturated with carbon dioxide at a raised pressure and at ambient temperature (20° C. to 25° C.) until the gas concentration is over the critical concentration. The gassing period is about 2 h for films. The pressures required depend on the polymer used and depend on the sorption characteristics of the corresponding polymer. In each case, a critical $CO_2$ concentration must be exceeded. The following concentrations given for certain polymers:

| | |
|---|---|
| Matrimid 5218: | 48 ± 5 cm³ CO₂ (STP)/cm³ (polymer) |
| PEI Ultem 1000: | 47 ± 5 cm³ CO₂ (STP)/cm³ (polymer) |
| PES 7300 P: | 47 ± 5 cm³ CO₂ (STP)/cm³ (polymer) |

These concentrations are concerned with the pressure cell method, and to a saturation period of 120 min at 25° C., and also to a foaming period of 30 s. A variation in the process means that the critical threshold concentration has to be determined anew.

After releasing the pressure and opening the pressure cell, the polymer sample is removed and immersed in a heating bath for about 30 seconds. The foaming process then takes place. The temperature of the heating bath must be above the glass transition temperature of the polymer/gas mixture and below a critical temperature. Then the polymer sample is quenched in an ethanol/water mixture (about 20° C.), preferably at a temperature that is below the glass transition temperature of the polymer.

EXAMPLE 1

Foaming of a polyimide with structural formula:

10 g of the polyimide Matrimid® 5218 (Manufacturer: Ciba Speciality Chemicals, Performance Polymers, Basel, Switzerland) was dissolved in 40 g of tetrahydrofuran (THF) and a 0.50 mm thick film was spread onto a glass plate. The film was dried in a stream of nitrogen (about 20° C.) and then at 30° C. or 150° C. in a vacuum drier until the solvent concentration (THF) was <0.02% by weight. Portions of the film produced (thickness ≦100 im) were saturated at 10, 20 and 50 bars and at ambient temperature (20° C. to 25° C.) with carbon dioxide in a pressure cell for 120 minutes. The carbon dioxide-saturated films were foamed at temperatures between 200° C. and 320° C. for 30 s. It was observed that the samples that had been saturated with a CO₂ gas pressure of 20 and 50 bars with a foaming temperature between 210° C. and 270° C. exhibited percolating, bicontinuous structures. Samples that had been saturated with a gas pressure of 10 bars of carbon dioxide exhibited no percolating structure.

Above 320° C., for a foaming period of 30 s and a saturating pressure of 50 bars, no foamed morphology could be obtained. Percolation was demonstrated by means of flow measurements.

Foaming conditions:

| | |
|---|---|
| saturation pressure: | 5 MPa |
| saturation gas: | carbon dioxide |
| saturation period: | 2 h |
| foaming temperature: | 260° C. |
| foaming period: | 30 s |

Interpretation of a scanning electron microscope exposure (magnification: 50 000): bicontinuous, percolating morphology with openings with a size of about 20 to 40 nm. Percolation behaviour was confirmed using the described flow measurements.

| | |
|---|---|
| saturation pressure: | 5 MPa |
| saturation gas: | carbon dioxide |
| saturation period: | 2 h |
| foaming temperature: | 270° C. |
| foaming period: | 30 s |

Interpretation of a scanning electron microscope exposure (magnification: 50 000): bicontinuous, percolating morphology with openings with a size of about 30 to 90 nm. Percolation behaviour was confirmed as above.

EXAMPLE 2

Foaming of a polyimide with structural formula:

10 g of the polyimide P84® (Manufacturer: HP Polymer GmbH, Lenzing, Austria) was dissolved in 40 g of 1-methyl-2-pyrrolidone (NMP) and a 0.50 mm thick film was spread onto a glass plate. The film was dried in a stream of nitrogen (about 20° C.) and then at 30° C. or 150° C. in a vacuum drier until the solvent concentration (NMP) was <0.02% by weight. Portions of the film produced (thickness ≦100 μm) were saturated at 30, 40 and 50 bars and at ambient temperature (20° C. to 25° C.) with carbon dioxide in a pressure cell for 120 minutes. The carbon dioxide-saturated films were foamed at temperatures between 180° C. and 280° C. for 30 s. It was observed that foaming the carbon dioxide-saturated films at temperatures between 220° C. and 270° C. produced bicontinuous structures. Percolation was confirmed by means of capillary rise.

Foaming conditions:

| | |
|---|---|
| saturation pressure: | 5 MPa |
| saturation gas: | carbon dioxide |
| saturation period: | 2 h |
| foaming temperature: | 260° C. |
| foaming period: | 30 s |

Interpretation of a scanning electron microscope exposure (magnification: 50 000): bicontinuous, percolating morphology with openings with a size of about 30 to 150 nm. Percolating behaviour was confirmed using capillary rise measurements.

EXAMPLE 3

Foaming of a polyetherimide with structural formula:

10 g of the polyetherimide Ultem® 1000 (Manufacturer: General Electric, Huntersville, N.C., USA) was dissolved in 40 g of chloroform and a 0.50 mm thick film was spread onto a glass plate. The film was dried in a stream of nitrogen (about 20° C.) and then at 30° C. or 150° C. in a vacuum drier until the solvent concentration (chloroform) was <0.02% by weight. Portions of the film produced (thickness ≦100 μm) were saturated at 50 bars and at ambient temperature (20° C. to 25° C.) with carbon dioxide in a pressure cell for 120 minutes. The carbon dioxide-saturated films were foamed at temperatures between 110° C. and 250° C. for 30 s. It was observed that foaming the carbon dioxide-saturated films at temperatures between 170° C. and 205° C. produced bicontinuous structures. Above 250° C., no foamed morphology could be obtained with a foaming period of 30 s and saturation pressures between 10 and 54 bars. Percolation was confirmed as described in Example 1. A bicontinuous, percolating morphology was obtained.

EXAMPLE 4

Foaming of a polyetherimide with structural formula:

For the polyetherimide Ultem® 1000-1000 (Manufacturer: General Electric, Bergen op Zoom, Netherlands), extruded films with a thickness of 75 im were used. The film was dried for 24 h at 150° C. in a vacuum drier. A portion of the treated film was saturated at 30, 40, 46 and 50 bars and at ambient temperature (20° C. to 25° C.) with carbon dioxide in a pressure cell for 120 minutes. The carbon dioxide-saturated films were foamed at temperatures between 130° C. and 250° C. for 30 s. It was observed that foaming temperatures between 150° C. and 210° C. could produce bicontinuous structures, in which the gas flow was dependent on the saturation concentration of dissolved $CO_2$. Above 250° C., for a foaming period of 30 s and saturated pressures of 10 and 54 bars, no foamed morphology could be obtained. For samples saturated with 30 bars of carbon dioxide, no percolating structure was observed, but rather a closed cell structure. Percolation was confirmed by means of the flow measurements described above.

Foaming conditions:

| | |
|---|---|
| saturation pressure: | 5 MPa |
| saturation gas: | carbon dioxide |
| saturation period: | 2 h |
| foaming temperature: | 180° C. |
| foaming period: | 30 s |

Interpretation of a scanning electron microscope exposure (magnification: 30 000): bicontinuous, percolating morphology with openings with a size of about 50 to 150 nm. Percolation behaviour was confirmed using the flow measurements described above.

Foaming conditions:

| | |
|---|---|
| saturation pressure: | 5 MPa |
| saturation gas: | carbon dioxide |
| saturation period: | 2 h |
| foaming temperature: | 195° C. |
| foaming period: | 30 s |

Interpretation of a scanning electron microscope exposure (magnification: 50 000): bicontinuous, percolating morphology with openings with a size of about 30 to 70 nm. Percolation behaviour was confirmed by means of the flow measurements described above.

COMPARATIVE EXAMPLE 1 AND EXAMPLE 5

Foaming a polyethersulphone with structural formula:

10 g of the polyethersulphone Sumicaexcel® 7300 P (Manufacturer: Sumitomo Chemicals, Japan) was dissolved in 40 g of 1-methyl-2-pyrrolidone (NMP) and a 0.50 mm thick film was spread onto a glass plate. The film was dried at 70° C. in a circulated air drier for 2 h and then the temperature was slowly raised to 180° C. The drying period at 180° C. was adjusted so that the solvent concentration (NMP) was <0.02% by weight.

A portion of the produced film (thickness ≦100 im) was saturated with carbon dioxide at:
i) 57 bars and 0° C.;
ii) 50 bars and 20° C.;
iii) 40 bars and 20° C.;

in a pressure cell for 120 min. The carbon dioxide-saturated film was foamed at temperatures $T_{foam}$) between 165° C. and 230° C. for 30 s. Above 230° C., no foamed morphology could be obtained with a foaming period of 30 s and saturation pressures of 40 and 50 bars. It was observed that the following combinations (foaming temperatures and saturation conditions), see Table 1, could produce percolating, bicontinuous structures. Percolation was confirmed using the flow measurements described above.

TABLE 1

Production of bicontinuous, percolating Sumicaexcel ® (7300 P) morphologies

| saturation conditions | $T_{foam}$: 165° C. | $T_{foam}$: 175° C. | $T_{foam}$: 185° C. | $T_{foam}$: 195° C. | $T_{foam}$: 205° C. |
|---|---|---|---|---|---|
| 57 bars $CO_2$ 0° C. | percolating | percolating | percolating | percolating | percolating |
| 50 bars $CO_2$ 20° C. | not percolating | not percolating | percolating | percolating | percolating |
| 40 bars $CO_2$ 20° C. | not percolating | not percolating | not percolating | not percolating | not percolating |

COMPARATIVE EXAMPLE 1

Foaming conditions:

| saturation pressure: | 4 MPa |
|---|---|
| saturation gas: | carbon dioxide |
| saturation period: | 2 h |
| foaming temperature: | 185° C. |
| foaming period: | 30 s |

Figure 2:
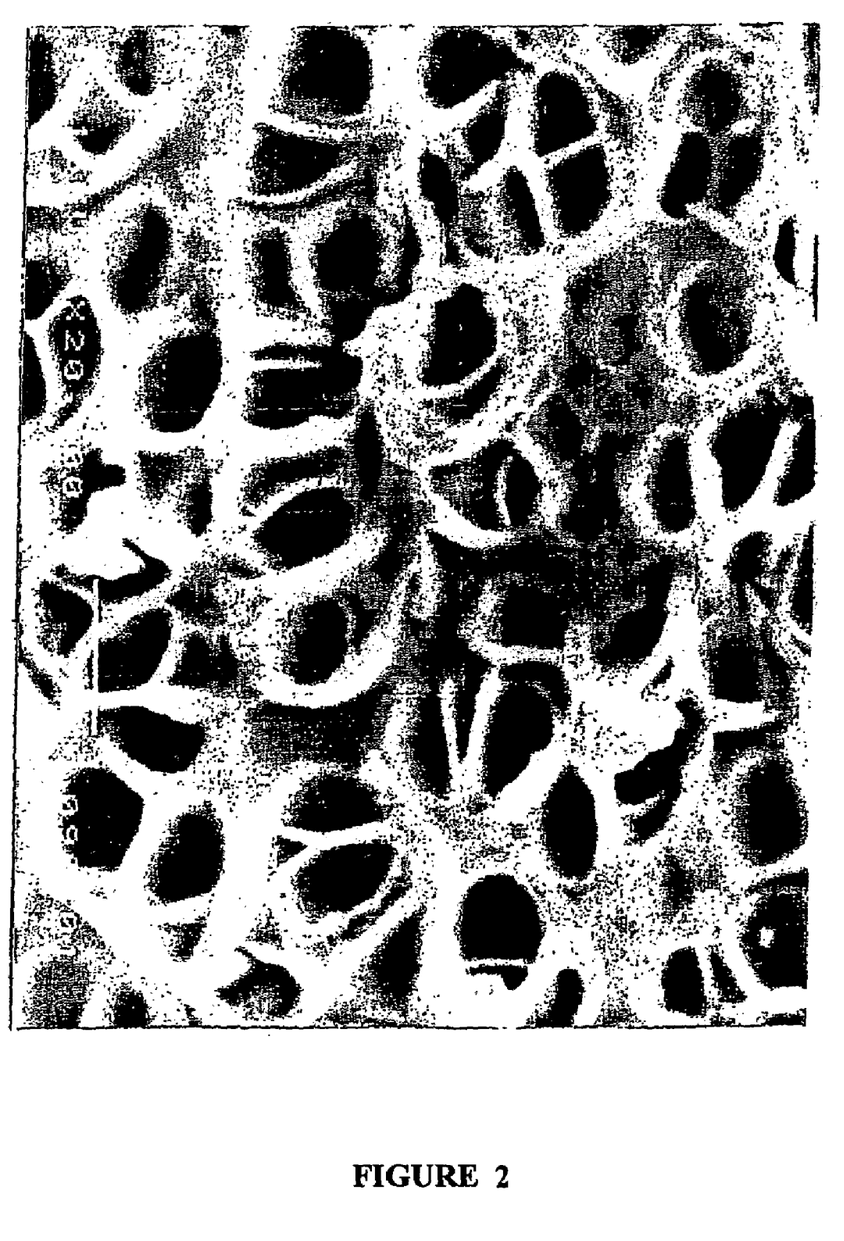
FIG. 2 is a scanning electron microscope exposure of a membrane prepared as described in comparative Example 1, not in accordance with the invention.

Details regarding scanning electron microscope exposure: FIG. 2
Magnification: 20 000
the white mark on the lower edge corresponds to 1 μm.

Interpretation: closed cell morphology with cells of the order of 300 to 800 nm, as the critical concentration on saturation with 4 MPa $CO_2$ was not reached.

EXAMPLE 5

Foaming conditions:

| saturation pressure: | 5 MPa |
|---|---|
| saturation gas: | carbon dioxide |
| saturation period: | 2 h |
| foaming temperature: | 185° C. |
| foaming period: | 30 s |

Figure 3:
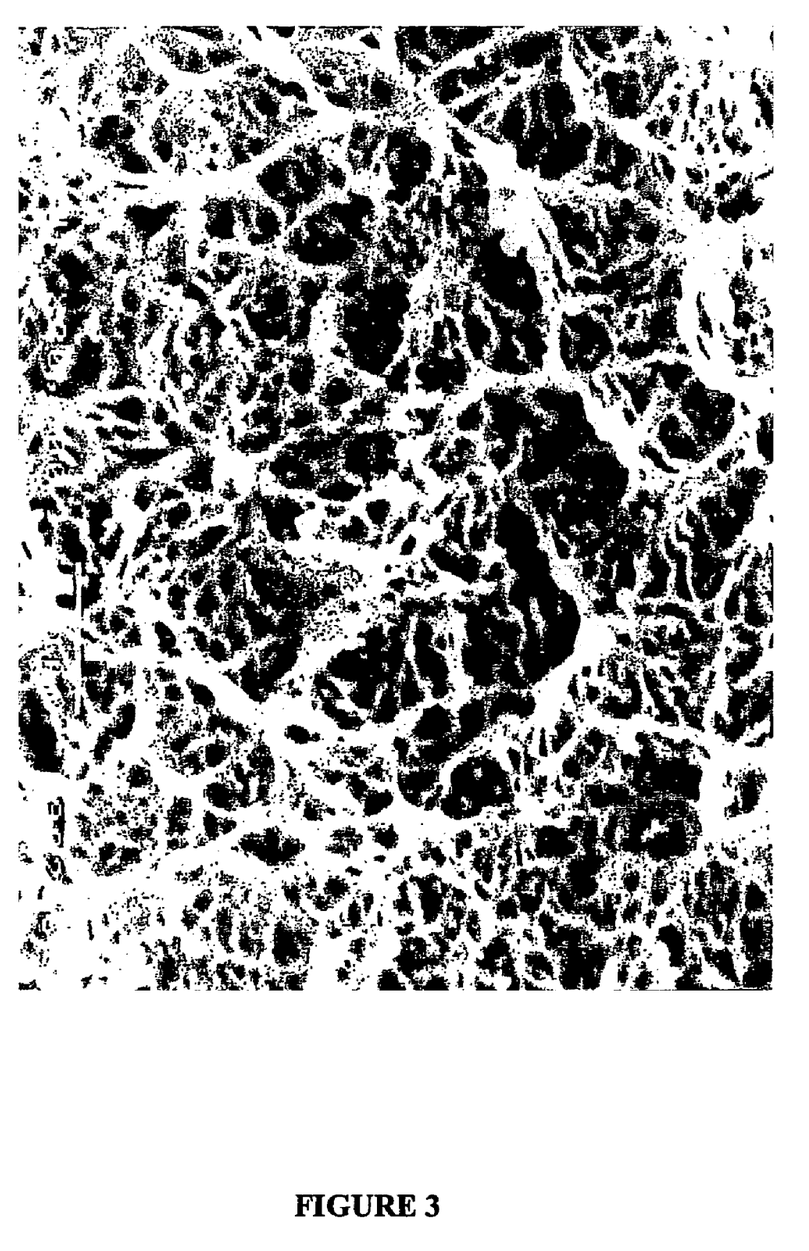
FIG. 3 is a scanning electron microscope exposure of a membrane prepared as described in Example 5, in accordance with the invention.

Details regarding scanning electron microscope exposure: FIG. 3
Magnification: 20 000
The white mark on the lower edge corresponds to 1 μm.

Interpretation: bicontinuous, percolating morphology with openings of the order of 200 to 300 nm, as the critical concentration on saturation with 5 MPa $CO_2$ was exceeded.

COMPARATIVE EXAMPLE 2

Foaming a polysulphone with structural formula:

10 g of the polysulphone Udel® P-3500 (Manufacturer: BP-Amoco, Belgium) was dissolved in 40 g of tetrahydrofuran (THF) and a 0.50 mm thick film was spread onto a glass plate. The film was dried at 20° C. in a stream of nitrogen and then at 30° C. or 150° C. in a vacuum drier until the solvent concentration (THF) was <0.02% by weight.

A portion of the produced film (thickness ≦100 im) was saturated at 50 bars and 20° C. with carbon dioxide in a pressure cell for 120 min. The carbon dioxide-saturated film was foamed at temperatures ($T_{foam}$) between 110° C. and 230° C. for 30 s. Above 230° C., no foamed morphology could be obtained with a foaming period of 30 s and a saturation pressure of 50 bars. It was observed that none of the foaming temperatures used could produce percolating, bicontinuous structures. Percolating behaviour was confirmed using the flow measurements described above.

Foaming conditions:

| | |
|---|---|
| saturation pressure: | 5 MPa |
| saturation gas: | carbon dioxide |
| saturation period: | 2 h |
| foaming temperature: | 145° C. |
| foaming period: | 30 s |

Figure 4:
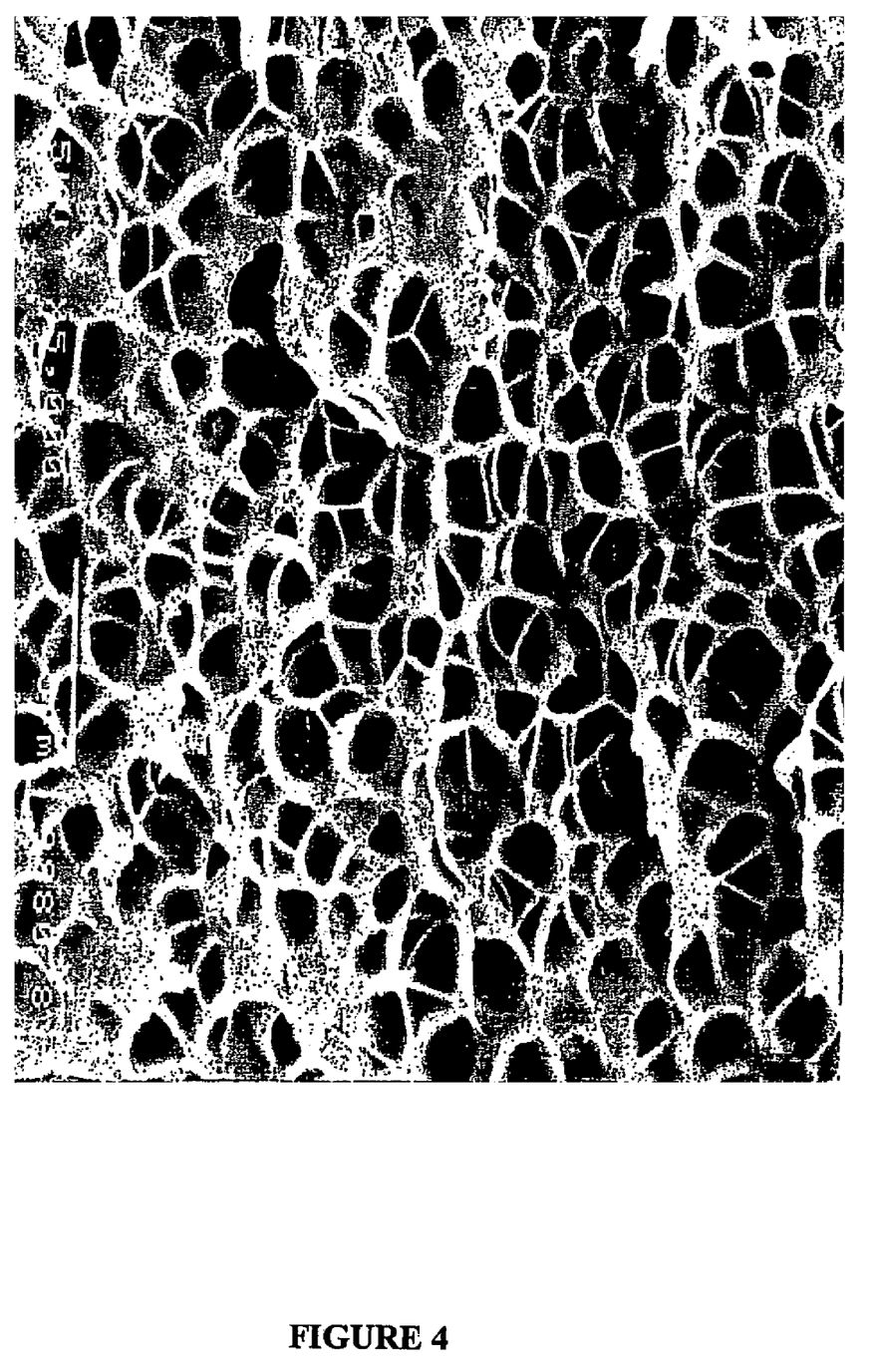
FIG. 4 is a scanning electron microscope exposure of a membrane prepared as described in comparative Example 2, not in accordance with the invention.

Details regarding scanning electron microscope exposure: FIG. 4

Magnification: 5000

The white mark on the lower edge corresponds to 5 µm.

Interpretation: closed cell morphology with cells of the order of 1 µm, as the critical concentration on saturation with 5 MPa $CO_2$ at 20° C. was not reached.

EXAMPLE 6

Foaming a polymer blend consisting of 80% by weight of Udel® P-3500 (polysulphone) and 20% by weight of Matrimid® 5218.

8 g of the Udel® P-3500 and 2 g of Matrimid® 5218 were dissolved in 40 g of dichloromethane and a 0.50 mm thick film was spread onto a glass plate. The film was dried at 50° C. in a circulated air drier for 2 h and then the temperature was slowly raised to 195° C. The drying period at 195° C. was adjusted so that the solvent concentration (dichloromethane) was <0.02% by weight.

A portion of the produced film (thickness ≦100 µm) was saturated at 50 bars and at 20° C. with carbon dioxide in a pressure cell for 120 min. The carbon dioxide-saturated film was foamed at temperatures ($T_{foam}$) between 120° C. and 280° C. for 30 s. Above 280° C., no foamed morphology could be obtained with a foaming period of 30 s and a saturation pressure of 50 bars. It was observed that foaming temperatures between 170° C. and 200° C. produced percolating, bicontinuous structures were produced. Percolating behaviour was confirmed using the flow measurements described above.

Foaming conditions:

| | |
|---|---|
| saturation pressure: | 5 MPa |
| saturation gas: | carbon dioxide |
| saturation period: | 2 h |
| foaming temperature: | 190° C. |
| foaming period: | 30 s |

Figure 5:
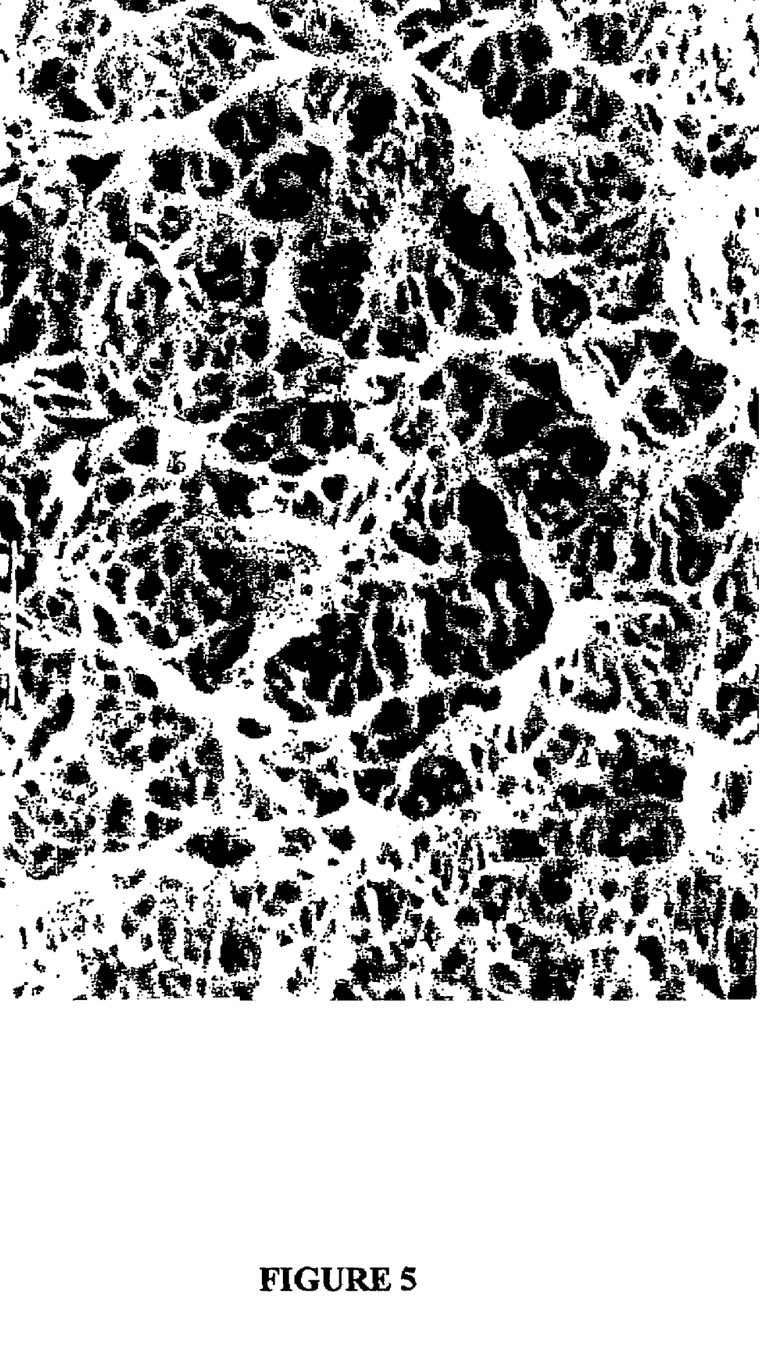
FIG. 5 is a scanning electron microscope exposure of a membrane prepared as described in Example 6, in accordance with the invention.

Details regarding scanning electron microscope exposure: FIG. 5.

Magnification: 20 000

The white mark on the lower edge corresponds to 1 µm.

Interpretation: bicontinuous, percolating morphology with openings of the order of 200 to 400 nm, as the critical concentration was exceeded on saturation.

The invention claimed is:

1. A method of forming a bicontinuous membrane comprising:
    forming a polymer or a polymer mixture into a desired form;
    charging the polymer or polymer mixture with a gas at a pressure that is above atmospheric pressure;
    foaming the gas-charged polymer or polymer mixture at a temperature that is above the glass transition temperature of the polymer/gas mixture and below the glass transition temperature of the pure polymer, wherein the gas-charged polymer or polymer mixture is foamed at a gas concentration in the polymer or polymer mixture that is above a critical concentration of at least 47 cm 3 (STP)/cm 3 of the polymer or polymer mixture and at a temperature that is lower than a critical temperature; and wherein the gas-charged polymer or polymer mixture is foamed without the addition of a polymer dissolving fluid; and
    stabilizing the foam structure to form the membrane.

2. The method as claimed in claim 1, wherein the temperature is at least 10° below the critical temperature.

3. The method as claimed in claim 1 wherein the polymer or polymer mixture comprises an amorphous or semi-crystalline polymer or polymer mixture.

4. The method as claimed in claim 1 wherein, the polymer or polymer mixture is charged with the gas at a temperature that is less than the glass transition temperature of the polymer/gas mixture and the temperature is subsequently raised above the glass transition temperature of the polymer/gas mixture but below the critical temperature of the polymer/gas mixture.

5. The method as claimed in claim 1 wherein, the gas is charged at a temperature that is higher than the glass transition temperature of the polymer/gas mixture but less than the critical temperature of the polymer/gas mixture, and wherein the polymer or polymer mixture is subsequently foamed by pressure release.

6. The method as claimed in claim 1 wherein, a melt of polymer or polymer mixture is charged with the gas in an extrusion tool and is foamed, by exit pressure release on exiting the extruder, at a temperature that is above the glass transition temperature of the polymer/gas mixture but less than the critical temperature.

7. The method as claimed in claim 1, wherein carbon dioxide is used as a charging gas.

8. The method as claimed in claim 1, wherein said step of stabilizing said foam structure comprises quenching.

9. The method as claimed in claim 8, wherein said quenching utilizes an ethanol/water mixture.

10. The method as claimed in claim 1 wherein said membrane comprises a polyimide, polyetherimide or polyethersulphone polymer.

11. The method as claimed in claim 10 wherein said membrane comprises a polymer mixture containing at least 20% of at least one of the polyimide, polyetherimide or polyethersulphone polymers.

12. The method as claimed in claim 10 wherein said membrane comprises a membrane in the form of a flat or hollow fiber membrane.

13. The method of claim 1 wherein the membrane has a structure with internal openings with a diameter of less than 500 nm, and is capable of being used in medical applications.

14. The method as claimed in claim 13 wherein the medical applications are selected from haemodialysis, haemofiltration, haemodiafiltration, plasmapheresis, immunotherapy, micro- or ultrafiltration, and gas separation.

* * * * *